(12) United States Patent
Nozuyama

(10) Patent No.: US 9,075,946 B2
(45) Date of Patent: Jul. 7, 2015

(54) METHOD FOR DESIGNING SEMICONDUCTOR INTEGRATED CIRCUIT

(71) Applicant: KABUSHIKI KAISHA TOSHIBA, Minato-ku, Tokyo (JP)

(72) Inventor: Yasuyuki Nozuyama, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 150 days.

(21) Appl. No.: 13/946,929

(22) Filed: Jul. 19, 2013

(65) Prior Publication Data

US 2013/0305208 A1 Nov. 14, 2013

Related U.S. Application Data

(60) Provisional application No. 13/237,053, filed on Sep. 20, 2010.

(30) Foreign Application Priority Data

Mar. 25, 2011 (JP) .................................. 2011-68363

(51) Int. Cl.
| | |
|---|---|
| H03K 19/00 | (2006.01) |
| G06F 17/50 | (2006.01) |
| H03K 3/012 | (2006.01) |
| G01R 31/3185 | (2006.01) |

(52) U.S. Cl.
CPC ........ *G06F 17/5068* (2013.01); *G06F 17/5045* (2013.01); *H03K 3/012* (2013.01); *G01R 31/318536* (2013.01)

(58) Field of Classification Search
None
See application file for complete search history.

(56) References Cited

U.S. PATENT DOCUMENTS

| | | | |
|---|---|---|---|
| 7,694,197 B2 | 4/2010 | Bancel et al. | |
| 8,127,188 B2 | 2/2012 | Hasegawa | |
| 2009/0212818 A1* | 8/2009 | Sakai et al. | ..................... 326/46 |
| 2010/0017760 A1* | 1/2010 | Kapur et al. | ..................... 716/2 |
| 2010/0213970 A1 | 8/2010 | Fukunaga et al. | |

FOREIGN PATENT DOCUMENTS

| | | |
|---|---|---|
| JP | 2006-003249 | 1/2006 |
| JP | 2010-256262 | 11/2010 |

OTHER PUBLICATIONS

Japanese Office Action issued on May 17, 2013 in the counterpart Japanese patent application No. 2011-068363, and English translation thereof.

* cited by examiner

*Primary Examiner* — Anh Tran
(74) *Attorney, Agent, or Firm* — White & Case LLP

(57) ABSTRACT

A semiconductor integrated circuit according to one embodiment includes a plurality of flip-flop groups configured by dividing a plurality of flip-flops, connected in series, for carrying out a serial operation of serially transferring data, a continuous signal determination circuit configured to output a first signal if outputs of the flip-flops contained in the flip-flop group match, and output a second signal in other cases; and a clock gating circuit configured not to provide a clock signal when receiving the first signal and to provide a clock signal when receiving the second signal with respect to the flip-flops other than a head of the flip-flop group.

6 Claims, 6 Drawing Sheets

FIG. 6

| F/F No | Clock | Cell_name | SI | SO |
|---|---|---|---|---|
| 1 | Clk1 | SFF1 | top.abcd.U3029.SI | top.abcd.U3029.Q |
| 2 | Clk1 | SFF1 | top.abcd.U3941.SI | top.abcd.U394.Q |
| 3 | Clk1 | SFF2 | top.acfg.U123.SI | top.acfg.U123.SO |
| 4 | Clk1 | SFF2 | top.acfg.U124.SI | top.acfg.U124.SO |
| 5 | Clk1 | SFF1 | top.acfg.U235.SI | top.acfg.U235.Q |
| 6 | Clk1 | SFF1 | top.acfg.U246.SI | top.acfg.U246.Q |
| . | . | . | . | . |
| . | . | . | . | . |

FIG. 7

| F/F No | Group | Clock | Cell_name | SI | SO |
|---|---|---|---|---|---|
| 1 | 1.1 | Clk1 | SFF1 | top.abcd.U3029.SI | top.abcd.U3029.Q |
| 2 | 1.2 | Clk1 | SFF1 | top.abcd.U3941.SI | top.abcd.U3941.Q |
| 3 | 1.3 | Clk1 | SFF2 | top.acfg.U123.SI | top.acfg.U123.SO |
| 4 | 1.4 | Clk1 | SFF2 | top.acfg.U124.SI | top.acfg.U124.SO |
| 5 | 2.1 | Clk1 | SFF1 | top.acfg.U235.SI | top.acfg.U235.SO |
| 6 | 2.2 | Clk1 | SFF1 | top.acfg.U246.SI | top.acfg.U246.SO |
| . | . | . | . | . | . |
| . | . | . | . | . | . |

US 9,075,946 B2

METHOD FOR DESIGNING SEMICONDUCTOR INTEGRATED CIRCUIT

CROSS-REFERENCE TO THE RELATED APPLICATION

This application is based upon and claims the benefit of priority from the prior Japanese Patent Application No. 2011-068363, filed on Mar. 25, 2011; the entire contents of which are incorporated by reference herein. This application is a divisional of U.S. application Ser. No. 13/237,053, filed on Sep. 20, 2010.

FIELD

Embodiments described herein relate generally to a semiconductor integrated circuit and a method for designing the same.

BACKGROUND

In recent years, higher integration and higher speed of the LSI (Large Scale Integrated circuit) are progressing. However, a strong restriction is imposed on the number of pins to be assigned to the power supply due to the limitation on the number of pins of the entire LSI. Thus, a great number of circuit blocks share the power supply wiring. As a result, lowering of power supply voltage and rising in ground potential may occur during the operation of the LSI. Furthermore, false operation of the LSI may occur in the worst case. Such so-called IR drop problem is becoming more serious with progress in higher integration and higher speed of the LSI.

BRIEF DESCRIPTION OF THE DRAWINGS

FIG. 6 is one example of the DFT information of the scan chain.

FIG. 7 is one example of the DFT information after grouping.

DETAILED DESCRIPTION

Figure 1:
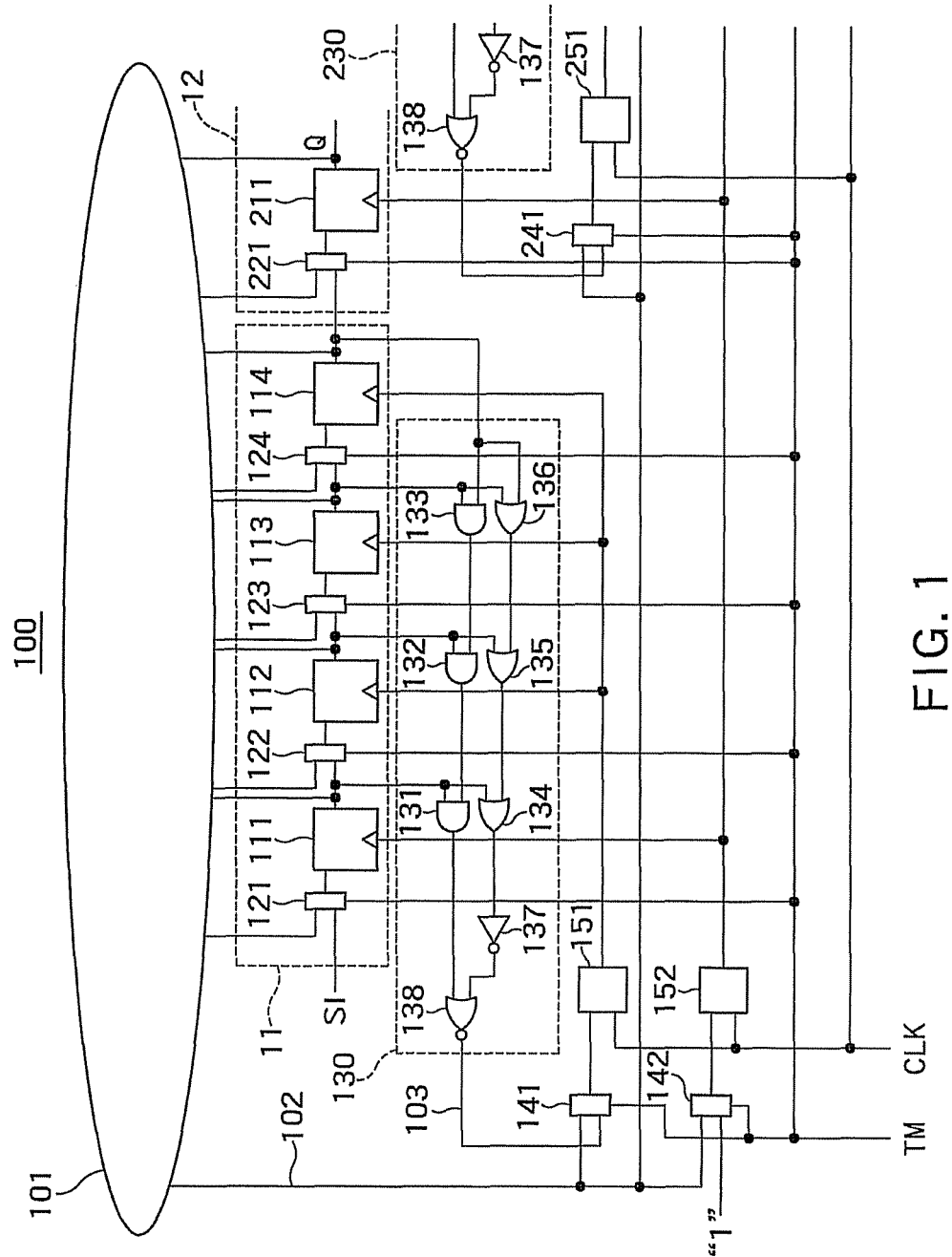
FIG. 1 is a view showing one part of configuration of a semiconductor integrated circuit according to one embodiment of the present invention.

A semiconductor integrated circuit according to one embodiment of the present invention includes a plurality of flip-flop groups configured by dividing a plurality of flip-flops connected in series for performing a serial operation of serially transferring data, and a continuous signal determination circuit for outputting a first signal if the outputs of the flip-flops in the flip-flop group match and otherwise outputting a second signal, and further includes a clock gating circuit which does not provide a clock signal when receiving the first signal and provides a clock signal when receiving the second signal with respect to the flip-flop other than the head of the flip-flop group.

The embodiment of the present invention will be hereinafter described with reference to the drawings. In each figure, the same reference numerals are denoted for the configuring elements having the same functions and the detailed description of the configuring element of the same reference numeral will not be repeated.

FIG. 1 shows one part of a configuration of a semiconductor integrated circuit 100 according to a first embodiment of the present invention. As shown in FIG. 1, the semiconductor integrated circuit 100 includes a combinational logic unit 101 to be scan tested, a flip-flop group 11, and a continuous signal determination circuit 130.

The semiconductor integrated circuit 100 can switch between a normal operation mode and a scan test mode (shift operation mode) by a test mode signal (TM). In other words, the mode is the normal operation mode of operating normally when TM=0, and is the scan test mode of performing the scan test when TM=1.

The combinational logic unit 101 is configured by combining combinational logic circuits such as an AND circuit, an OR circuit, an inverter, and a buffer. The combinational logic unit 101 is configured to realize a predetermined logic function at the time of the normal operation with a flip-flop and a latch shown in FIG. 1.

The flip-flop group 11 includes flip-flops (scan F/F) 111 to 114 and multiplexers 121 to 124. The flip-flops 111 to 114 are connected in series through the multiplexers 122 to 124, and output to the combinational logic unit 101.

As shown in FIG. 1, the multiplexers 121 to 124 have two input terminals, where one input terminal is connected to the combinational logic unit 101 and the other input terminal is connected to a scan-in terminal (SI) or the flip-flop of the previous stage. A test mode signal is used for a select signal of the multiplexers 121 to 124.

Therefore, in the normal operation mode, the data output from the combinational logic unit 101 is stored in the flip-flops 111 to 114 through the multiplexers 121 to 124. In the scan test mode, the data of the scan-in terminal (or output of flip-flop of previous stage (not shown)) and the data output from the flip-flops 111 to 113 are stored in the flip-flops 111 to 114 through the multiplexers 121 to 124. In other words, in the scan test mode, the flip-flops 111, 112, . . . are connected in series, where the output (Q or SO (Scan Out) which is buffered output of Q) of the respective flip-flop is input to the flip-flop of the next stage. Therefore, the data stored in the flip-flops 111 to 114 are shifted to the flip-flop of the next stage every clock cycle. The flip-flop group 11 has been described herein, but other flip-flop groups after the flip-flop group 12 are also similar.

The flip-flop group 12 is connected behind the flip-flop group 11. The flip-flop group 12 includes flip-flops 211 to 214 and multiplexers 221 to 224 (flip-flops 212 to 214 and multiplexers 222 to 224 are not shown). As shown in FIG. 1, the flip-flop group 12 includes the flip-flop 211, which is connected to the flip-flop 114 at the tail of the flip-flop group 11 through the multiplexer 221, as the head flip-flop.

Although not shown, flip-flop groups 13, 14, . . . are sequentially connected following the flip-flop group 12.

The flip-flop groups 11, 12, . . . configure a scan chain capable of controlling and observing the flip-flops 111, 112, . . . using the scan-in terminal and the scan-out terminal of the semiconductor integrated circuit 100 at the time of the scan test mode. The scan chain is configured exterior to the combinational logic unit 101. The scan chain includes a plurality of flip-flops 111 to 114, 211, . . . connected in series, and carries out a serial operation of serially transferring data. The flip-flop groups 11, 12, . . . are obtained by dividing the scan chain so that each has a predetermined number of flip-flops (four in the present embodiment).

As shown in FIG. 1, the output terminals (Q) of the flip-flops 111, 112, . . . are connected to the combinational logic unit 101, so that the outputs of the flip-flops 111, 112 are input to the combinational logic unit 101 at the time of the normal operation mode.

The continuous signal determination circuit 130 outputs "0" if the outputs (Q output or SO output) of the flip-flops 111 to 114 in the flip-flop group 11 match, that is, if the outputs of the flip-flops 111 to 114 are all "0" or all "1", and outputs "1" in other cases.

As shown in FIG. 1, the continuous signal determination circuit 130 includes AND gates 131 to 133, OR gates 134 to 136, an inverter 137, and a negative OR (NOR) gate 138. The continuous signal determination circuit 130 is configured to take the negative logical sum of the logical product (AND) and the inversion (NOT) of the logical sum (OR) for the output signals of the flip-flops 111 to 114 of the flip-flop group 11.

More specifically, the output of the AND gate 131 and the output of the inverter 137 are input to the NOR gate 138 to be output to a clock gating control line 103. The output of the AND gate 131 is "1" only when the outputs of the flip-flops 111 to 114 are all "1". On the contrary, the output of the inverter 137 is "1" only when the outputs of the flip-flops 111 to 114 are all "0". Therefore, the output of the NOR gate 138 is "0" only when the outputs of the flip-flops 111 to 114 are all "1" or "0".

A continuous signal determination circuit 230 having a configuration similar to the continuous signal determination circuit 130 is also arranged with respect to the flip-flop group 12. A circuit for determining whether or not the outputs of the flip-flops of the relevant flip-flop group match is arranged with respect to the flip-flop group after the flip-flop group 12.

As shown in FIG. 1, the semiconductor integrated circuit 100 further includes multiplexers 141, 142, and clock gating circuits 151, 152.

The multiplexers 141, 142 respectively outputs an enable signal of the clock gating circuits 151, 152, and uses the test mode signal for the select signal.

The multiplexer 141 outputs the signal of the clock gating control line 102 when TM=0 (normal operation mode), and outputs the signal of the clock gating control line 103 when TM=1 (scan test mode). The multiplexer 142 outputs the signal of the clock gating control line 102 when TM=0, and always outputs the signal "1" when TM=1.

The control signal for clock gating carried out in the normal operation mode is provided to the clock gating control line 102. The signal output from the continuous signal determination circuit 130 is provided to the clock gating control line 103.

The clock gating circuits 151, 152 are circuits configured to perform clock gating (disabling of clock signal). For example, the clock gating circuits 151, 152 are respectively configured using the AND gate of two inputs.

As shown in FIG. 1, the clock gating circuit 151 enables/disables the clock signal with respect to the flip-flops 112 to 114, and the clock gating circuit 152 enables/disables the clock signal with respect to the flip-flop 111. The clock gating circuit 152 also enables/disables the clock signal with respect to the flip-flop at the head of the flip-flop group after the flip-flop group 12.

The clock gating circuit 151 has a clock signal (CLK) input from one terminal, and a signal output from the multiplexer 141 is input from the other terminal (enable input terminal). The clock gating circuit 151 outputs the CLK signal when the signal output from the multiplexer 141 is "1", and does not output the clock signal when the signal output from the multiplexer 141 is "0".

The clock gating circuit 152 has a clock signal input from one terminal, and a signal output from the multiplexer 142 is input from the other terminal (enable input terminal). The clock gating circuit 152 outputs the CLK signal when the signal output from the multiplexer 142 is "1", and does not output the clock signal when the signal output from the multiplexer 142 is "0".

The multiplexer 241 has a function similar to the multiplexer 141, and outputs an enable signal of the clock gating circuit 251. The clock gating circuit 251 functions similar to the clock gating circuit 151, and enables/disables the clock signal with respect to the flip-flops other than the flip-flop 211 at the head of the flip-flop group 12.

According to the configuration described above, in the normal operation mode (TM=0), the signal of the clock gating control line 102 is input to the enable input terminals of the clock gating circuits 151, 152 through the multiplexers 141, 142. As a result, the flip-flops 111 to 114 are clock gating controlled by the signal of the clock gating control line 102. This is similar in the flip-flop groups after the flip-flop group 12. Therefore, all the flip-flops configuring the scan chain are clock gating controlled by the signal of the clock gating control line 102 in the normal operation mode.

In the scan test mode (TM=1), the continuous signal determination circuit 130 outputs "0" if the data stored in the flip-flops 111 to 114 are all "0" or "1". The "0" signal is input to the enable input terminal of the clock gating circuit 151 through the multiplexer 141. As a result, the flip-flops 112 to 114 are gated. The clock gating control of the flip-flops during the scan test mode is carried out for every flip-flop group.

The multiplexer 142 always outputs the signal "1" during the scan test mode, and hence "1" is input to the enable input terminal of the clock gating circuit 152. The clock signal is thus always enabled, i.e., provided to the flip-flop 111, and the flip-flop 111 is not clock gating controlled during the scan test mode. The reason why the flip-flop 111 is always operated during the scan test mode is that the flip-flop 111 needs to detect the toggle (signal change of "1"→"0" or "0"→"1") of the input signal to the flip-flop group 11.

As described above, at the time of the scan test mode, the flip-flop (111, 211, etc.) at the head of each flip-flop group is always operated, and the other flip-flops are clock gating controlled by the signal of the clock gating control line 103.

As a specific operation example, consider a case where "1" is continuously shift input to the flip-flop group and "1" is stored in all the flip-flops 111 to 114 in the scan test mode. In this case, the output of the continuous signal determination circuit 130 becomes "0", and "0" is input to the enable input terminal of the clock gating circuit 151, whereby the clock signal (pulse) to the flip-flops 112 to 114 is disabled (not provided).

A state in which the clock signal to the flip-flops 112 to 114 is disabled is continued as long as "1" is shift input to the flip-flop 111.

When "0" is transferred to the input terminal (SI) of the head flip-flop 111 thereafter, "0" is input to the flip-flop 111 in the next clock. In this case, the continuous signal determination circuit 130 outputs "1" and hence "1" is input to the enable input terminal of the clock gating circuit 151. As a result, the clock signal (pulse) to the flip-flops 112 to 114 is enabled (provided), and the flip-flops 112 to 114 are able to shift the input data.

The operation described above is similarly carried out when "0" is continuously shift input to the flip-flop group 11 and "0" is stored in all the flip-flops 111 to 114. The clock signal to the flip-flops 112 to 114 is disabled (not provided) as long as "0" is input to the flip-flop 111. When "1" is stored in the head flip-flop 111, the clock signal is enabled and the flip-flops 112 to 114 are able to shift the input data.

As can be seen from the description above, when data in which "1" or "0" is continued for N bits (N≥4) is shift input to the flip-flop group 11, "1" or "0" is stored in all four flip-flops 111 to 114 in a certain cycle (time). In the next cycle, the clock signal (pulse) to the flip-flops 112 to 114 other than the head flip-flop 111 is disabled (not provided). More specifically, the clock signal to the flip-flops 112 to 114 is disabled during the (N−3) cycle. As a result, the power consumption of the flip-flop group 11 in the scan test mode can be reduced. Furthermore, the data shift output from the flip-flop group 11 is serial transferred to the flip-flop group after the flip-flop group 12 so that the power consumption can also be reduced for the flip-flop groups after the flip-flop group 12.

Figure 2:
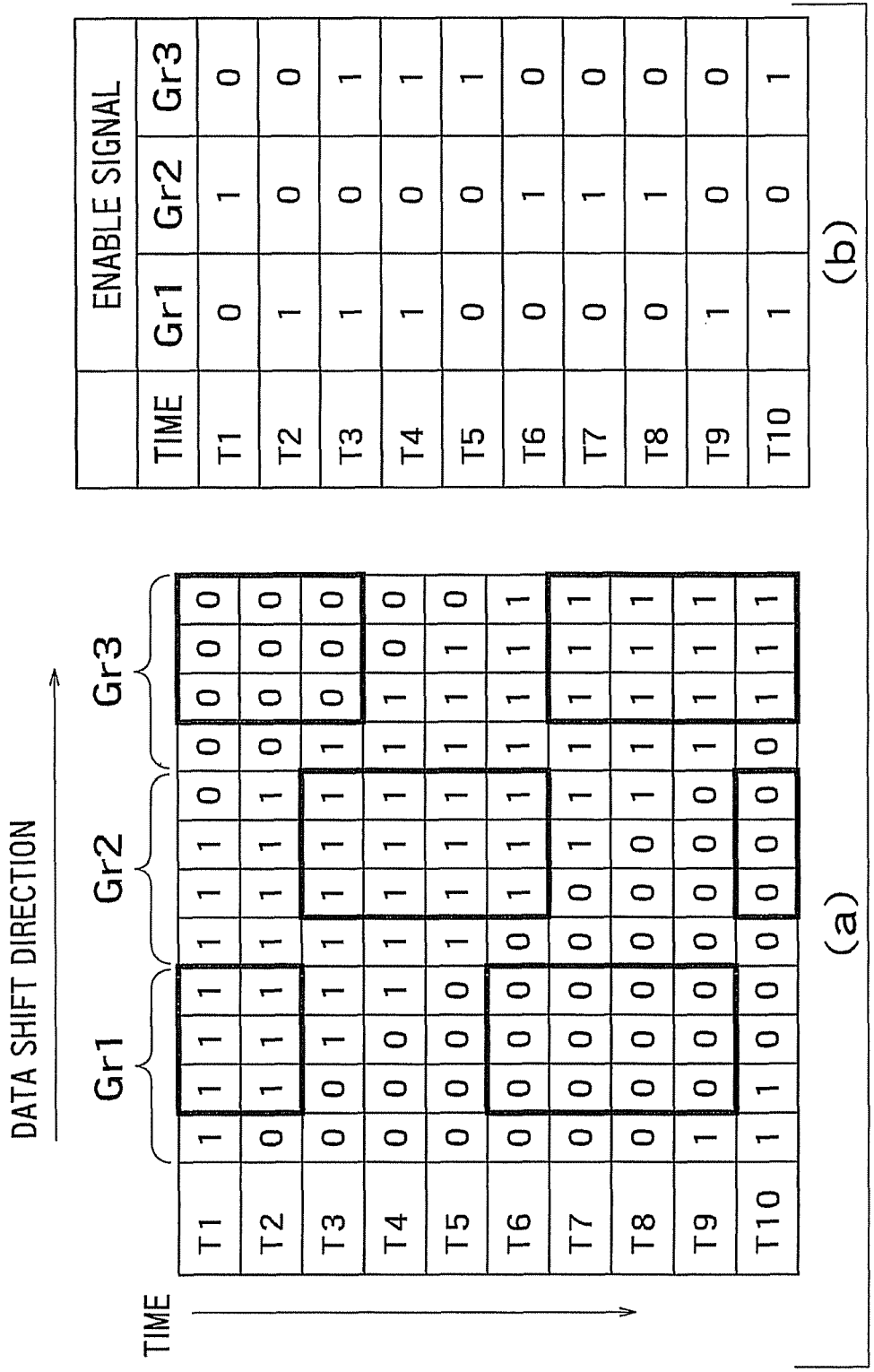
FIG. 2 is a view showing one example of a state of clock gating according to one embodiment of the present invention.

The state of clock gating will be visually described using FIG. 2. FIG. 2 shows a state of clock gating occurrence when the data in which "1" and "0", which continue for seven bits, alternately appear is shift input to the scan chain. The scan chain is configured by three flip-flop groups (Gr1, Gr2, and Gr3). Similar to the flip-flop group 11 described above, each flip-flop group Gr1, Gr2, and Gr3 includes four flip-flops (scan F/F) connected in series.

In FIG. 2(a), the horizontal direction to the right indicates the shift direction of the data stored in the flip-flop, and the vertical direction downward indicates time in units of cycles. FIG. 2(a) shows ten cycles (T1, T2, ..., T10). The scan shift operation is represented such that each data moves diagonally downward toward right for every cycle.

In FIG. 2(a), the portion surrounded with a thick frame shows that the clock gating is effective (i.e., clock signal is not enabled). The clock is always supplied to the flip-flops at the head of the flip-flop groups Gr1, Gr1, Gr3 since they are not target of clock gating.

FIG. 2(b) shows the enable signal of the clock gating control in each flip-flop group for every cycle. The enable signal is an output signal of the continuous signal determination circuit, and is automatically generated according to the shift input data.

As apparent from FIGS. 2(a) and 2(b), the enable signal is determined one cycle before the clock gating is carried out. Thus, the clock gating is made effective in the cycle after the cycle in which the values of the flip-flops configuring the flip-flop group match.

In the case shown in FIG. 2, the effective clock gating rate defined as a value obtained by dividing the sum of the cycles in which the clock gating is carried out by all the cycles is 45% (=54/120).

As described above, in the present embodiment, the clock signal (pulse) to the flip-flops other than head of the flip-flop group is disabled (not provided) according to the data shift input to the scan chain. Therefore, according to the present embodiment, the power consumption of the scan chain at the time of the scan test can be lowered.

Furthermore, according to the present embodiment, the IR drop can be alleviated since the number of flip-flops operating in the scan test mode is reduced.

The IR drop may suddenly occur during the scan test operation due to much more toggles compared to those during the normal operation. According to the present embodiment, however, the problem of so-called overkill in which the semiconductor integrated circuit that can be considered as a non-defective product is determined as a defective product in the shipment test can be alleviated since the IR drop can be alleviated. Consequently, according to the present embodiment, the yield of the semiconductor integrated circuit is enhanced.

In the description made above, the number of flip-flops (hereinafter referred to as "number of elements" or "number of grouped elements") contained in the flip-flop group is four, but is not limited thereto. The number of grouped elements becomes the unit of clock gating during the shift operation. The number of grouped elements is preferably determined so that the effective clock gating rate becomes the largest according to the data shift input to the scan chain. This will be described in detail below.

The test pattern input in the scan chain is generated by an automatic test pattern generation tool (hereinafter referred to as "ATPG tool"). The ATPG tool generates a test pattern after grasping the information related to all the scan chains inserted into the logical network of the LSI. The recent ATPG tool has a function (toggle reducing function) of generating a test pattern with smaller number of toggles. The effective clock gating rate can be further enhanced by utilizing the such function.

First, a histogram showing the number of occurrences for every number of times (cycles) the same data continues (hereinafter referred to as "same data continuing number") is created for the test pattern generated by the ATPG tool. The histogram may be created for the entire test pattern or may be created for the data pattern obtained by sampling the test pattern at an appropriate percentage.

Figure 3:
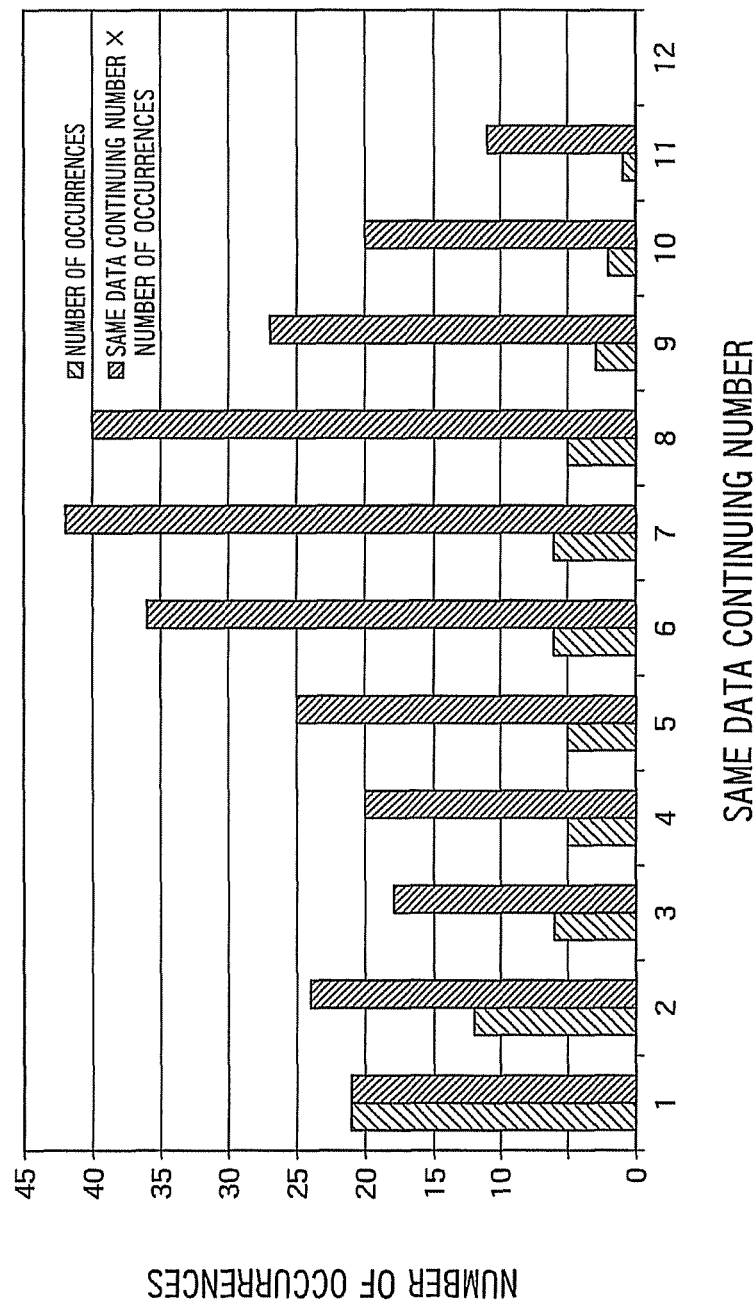
FIG. 3 shows one example of a histogram for obtaining a maximum effective data continuing number.

FIG. 3 shows one example of a created histogram. In this example, the number of occurrences is the most when the same data continuing number is 1, and the number of occurrences decreases as the same data continuing number increases to 2 to 5. With respect to the same data continuing number 6, 7, the number of occurrences increases by the toggle reducing function of the ATPG tool. In same continuing data number of 8 or more, the number of occurrences decreases as the same data continuing number increases.

The same data continuing number in which the product of the same data continuing number and its number of occurrences becomes maximum (hereinafter referred to as "maximum effective data continuing number") is acquired. The maximum effective data continuing number n is a parameter that becomes a basis in optimizing the effective clock gating rate. FIG. 3 also shows the histogram of the maximum effective data continuing number. In this example, the product of the same data continuing number and its number of occurrences becomes maximum when the same data continuing number is 7, and hence the maximum effective data continuing number n is 7.

Now, consider representing the effective clock gating rate using the maximum effective data continuing number n and the number of grouped elements m. First, the effective clock gating rate in a case the number of grouped elements and the maximum effective data continuing number are equal (i.e., n=m) will be described.

In this case, the clock signal to the m−1 (i.e., n−1) flip-flops other than the head of the flip-flop group is disabled only once in n cycles. The effective clock gating rate R_CG is thus expressed with equation (1).

$$R\_CG = \left\{ N_{SC} \cdot \frac{n-1}{n} \cdot \frac{N}{n} \right\} / (N_{SC} \cdot N) = \frac{n-1}{n^2} \quad (1)$$

Here, Nsc: length of scan chain (total number of flip-flops configuring scan chain), N: shift operation frequency (number of bits to shift per unit time (one cycle)), n: maximum effective data continuing number.

As apparent from equation (1), the effective clock gating rate R_CG monotonously decreases as the maximum effective data continuing number n becomes larger. Therefore, if the maximum effective data continuing number n is the number of grouped elements m (i.e., n=m), the characteristic in that the toggle is small (i.e., maximum effective data continuing number n is large) in the test pattern generated by the ATPG tool cannot be exhibited.

Consider having the number smaller than the maximum effective data continuing number n as the number of grouped elements m. In this case (i.e., n>m), the effective clock gating rate R_CG(m) is expressed with equation (2) as a function of m.

$$R\_CG(m) = \left\{ N_{SC} \cdot \frac{m-1}{m} \cdot \frac{N(n-m+1)}{n} \right\} / (N_{SC} \cdot N) = \frac{(m-1)(n-m+1)}{nm} \quad (2)$$

Here, Nsc: length of scan chain, N: shift operation frequency, n: maximum effective data continuing number, m: number of grouped elements.

Differentiating equation (2) with m, equation (3) is obtained.

$$\frac{dr\_CG(m)}{dm} = -\frac{m^2 - (n+1)}{nm^2} \quad (3)$$

Solving dR_CG(m)/dm=0, equation (4) is obtained.

$$m = \sqrt{n+1} \quad (4)$$

Therefore, the number of grouped elements m_best that gives the highest effective clock gating rate with respect to the maximum effective data continuing number n is obtained with equation (5).

$$m\_best = Nearest\_int(\sqrt{n+1}) \quad (5)$$

Here, the function Nearest_int is a function returning a nearest integer from an argument.

According to equation (5), for example, m_best=3 when n=7, and m_best=4 when n=12.

Figure 4:
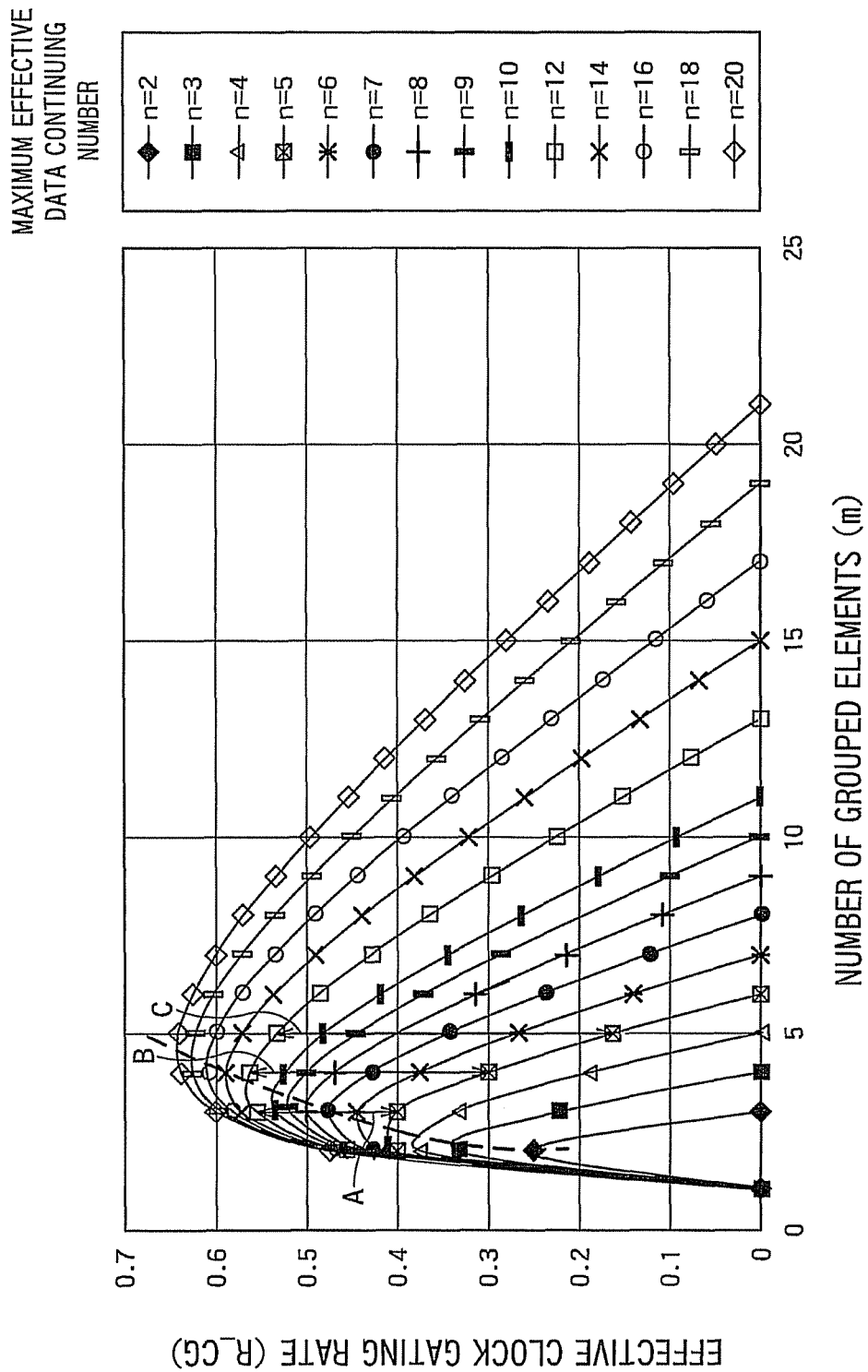
FIG. 4 is one example of a graph showing an effective clock gating rate with respect to a number of grouped elements.

FIG. 4 is a graph in which the effective clock gating rate R_CG is plotted with respect to the number of grouped elements m when the maximum effective data continuing number n is between 2 and 20. The broken line in FIG. 4 shows the trajectory of the number of elements m_best that gives the maximum effective clock gating rate with respect to the maximum effective data continuing number n. Thus, the value of the number of elements m_best is proportional to the square root of the maximum effective data continuing number n, and hence gradually increases with respect to increase in the maximum effective data continuing number n.

As the value of m becomes smaller, the additional hardware such as the continuous signal determination circuit 130 and the clock gating circuit 151 increases. Therefore, the number of grouped elements may be determined in view of the trade off between the increase in hardware scale and the effect (alleviation of IR drop etc.) obtained at lower power consumption.

As apparent from FIG. 3, (same data continuing number)× (number of occurrences) may not necessarily become considerably large only for a specific same data continuing number. In other words, (same data continuing number)×(number of occurrences) are assumed to often become values approaching each other for a plurality of same continuing data numbers. Consideration is made on such an aspect and on the fact that the additional hardware amount increases as the number of grouped elements becomes smaller. One of the plurality of same continuing data numbers may be determined as the maximum effective data continuing number n, and the number of grouped elements may be calculated with equation (5) with respect to such maximum effective data continuing number n. For instance, in the case of FIG. 3, the number of grouped elements may be obtained by substituting n=8 to equation (5). Therefore, the increase in hardware can be suppressed compared to when n=7, and the balance between the reduction effect of the power consumption and the hardware amount can be enhanced.

The arrows A, B, C in FIG. 4 show the range of the effective clock gating rate with respect to the number of grouped elements m=3, 4, 5, when the maximum effective data continuing number n=5 to 12 is assumed. If the number of grouped elements is 3, the effective clock gating rate highest on average is obtained. However, the effective clock gating rate in a practically tolerable range can be obtained even if m=4, 5 where the additional hardware amount is less than m=3 by taking into consideration that the possibility of n>10 is actually significantly small.

Furthermore, a sufficiently high effective clock gating rate is obtained for the number of grouped elements 2 or 6 depending on the maximum effective data continuing number. In general, the number of grouped elements m is preferably in a range of m_best−1≤m≤m_best+3 with respect to an integer m_best obtained with equation (5).

In any case, the number of grouped elements m desirably select an appropriate value in view of the trade off between the reduction effect of the power consumption and the additional hardware amount, or the like.

The number of grouped elements is not limited to one, and a plurality of values may be used for the number of grouped elements so that the scan chain can be divided into a plurality of flip-flop groups. For instance, the number of grouped elements of the flip-flop group 11 may be 4, and the number of grouped elements of the flip-flop group 12 may be 3.

The additional circuit for realizing lower power consumption such as the continuous signal determination circuit 130 does not necessarily need to be inserted with respect to all the flip-flops configuring the scan chain. In other words, the additional circuit may be inserted only on the portion where the problem of IR drop and the like are the largest as a result of analyzing the operation of the semiconductor integrated circuit by the test pattern.

In the internal configuration of the continuous signal determination circuit 130, the gate element (AND gate and OR gate) all have two inputs in order to suppress the increase of the signal wiring in FIG. 1, but this is not the sole case. For instance, if it is effective to suppress the area of the gate element rather than to increase the signal wiring to suppress the area of the semiconductor integrated circuit, the continuous signal determination circuit may be preferably configured using a multi-input gate element having three or more inputs. The logical product (AND) may be replaced with negative logical sum (NOR) and the logical sum (OR) may be replaced with negative logical product (NAND) by appropriately using inverted signal of the Q output or the SO output in place of such Q output or the SO output to configure the continuous signal determination circuit.

If the continuing number of "1" is significantly greater than the continuing number of "0" as a result of analyzing the test pattern, the OR gates 134 to 136 and the inverter 137 of the continuous signal determination circuit 130 may be deleted, and only the continuation of "1" may be detected. In this case, the input terminal of the NOR gate 138 connected to the inverter 137 is grounded. In other words, the continuous signal determination circuit 130 is configured to output a value obtained by inverting the value obtained by taking the logical product for the output signals of all the flip-flops of the flip-flop group. The hardware amount of the continuous signal determination circuit 130 is thereby reduced to about half.

Similarly, if the continuing number of "0" is significantly greater than the continuing number of "1" as a result of analyzing the test pattern, the AND gates 131 to 133 of the continuous signal determination circuit 130 may be deleted, and only the continuation of "0" may be detected. In this case, the input terminal of the NOR gate 138 connected to the AND gate 131 is grounded. In other words, the continuous signal determination circuit is configured to output a value obtained by taking the logical sum for the output signals of all the flip-flops of the flip-flop group.

Various types of logical gate circuits (AND, OR, etc.) configuring the continuous signal determination circuit may be replaced with a pre-charging type circuit.

The target of dividing into a plurality of flip-flop groups is not limited to the scan chain, and a general shift register inside the semiconductor integrated circuit 100 may serve as a target. The shift register may be divided into a plurality of flip-flop groups, and each flip-flop group may include the continuous signal determination circuit 130 and the like, so that the IR drop can be suppressed in the normal operation.

Figure 5:
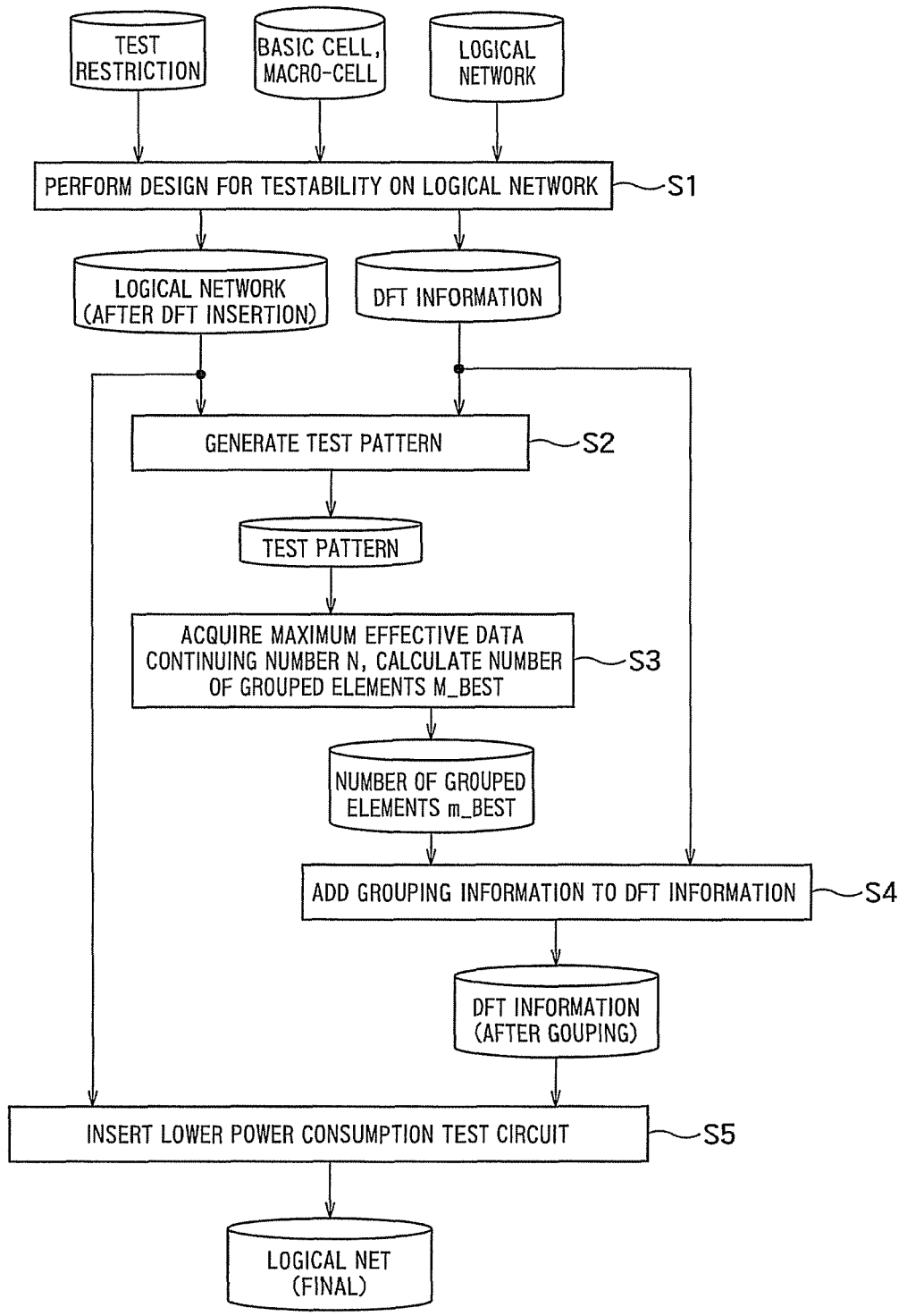
FIG. 5 is a flowchart showing a method for designing a semiconductor integrated circuit according to one embodiment of the present invention.

The method for designing the semiconductor integrated circuit 100 according to the present embodiment will now be described along the flowchart of FIG. 5. FIG. 5 shows the procedure for designing a semiconductor integrated circuit inserted with a lower power consumption test circuit (hereinafter also referred to as "LP test circuit").

(1) First, the design for testability (DFT) of inserting a DFT circuit is performed on a logical network of the semiconductor integrated circuit for realizing the normal operation (step S1). The logical network herein is configured by basic-cells such as combinational logic gates, flip-flops and latches as the target of the ATPG, and macro-cells such as CPU (Central Processing Unit) cores, memories, A-D (Analog-Digital) converters, D-A converters, and PLL (Phase-Locked Loop) circuits. Some macro-cells may include scan chains, also being the target of the ATPG.

The information used in step S1 includes test restriction which is the specification of the scan test, the basic-cells including the flip-flops, latches and the combinational logical gates configuring the combinational logic, and the logical network showing the logical circuit configuration of the basic-cells and macro-cells. The logical network is created by logical synthesis from the high level description by the RTL (Register Transfer Level), or the like.

The logical network after the DFT insertion (i.e., logical network information inserted with the DFT circuit) and the DFT information are created by executing step S1. The DFT information shows the connection state of the flip-flop configuring the scan chain.

FIG. 6 shows one example of the DFT information of the scan chain. In FIG. 6, the "F/F No." column at the left end shows the connecting order of the flip-flop (scan F/F). The "Clock" column shows the name of the clock that provides the clock signal to the flip-flop. The "Cell_name" column shows the name of the cell of the flip-flop. The "SI" column shows the name of the input terminal (scan-in terminal) of the flip-flop containing the hierarchical information of the logical network of the LSI. The "SO" column shows the name of the output terminal (scan-out terminal) of the flip-flop containing the hierarchical information of the logical network of the LSI.

The DFT information shows that the SO terminal of the flip-flop in a certain row is connected to the SI terminal of the flip-flop in the next row in the test mode. For instance, the output terminal (top.abcd.U3029.Q) of the F/F No. 1 is connected to the input terminal (top.abcd.U3941.SI) of the F/F No. 2.

(2) The test pattern is then generated using the ATPG tool (step S2). The information related to the logical network after the DFT insertion and the DFT information, which are both obtained in step S1, are used to generate the test pattern. The DFT information is used because the ATPG generates the test pattern corresponding to the configuration of the scan chain.

The test pattern with as small number of toggles as possible is preferably generated to enhance the effective clock gating rate and to suppress the IR drop.

(3) The data array of the test pattern obtained in step S2 is then analyzed to acquire the maximum effective data continuing number n. The number of grouped elements is calculated based on the maximum effective data continuing number n (step S3). For instance, the number of grouped elements m_best that realizes the highest effective clock gating rate is calculated by substituting the maximum effective data continuing number n to equation (5).

The analysis of the test pattern is carried out, for example, by creating a histogram of the same data continuing number, as described using FIG. 3.

The effective clock gating rate may be calculated by substituting the calculated number of grouped elements m_best to equation (2), and such effective clock gating rate may be used as the report information to the designer.

(4) The grouping information is added to the DFT information using the number of grouped elements m_best calculated in step S3 to create the DFT information after grouping (step S4). Such grouping information is the information for dividing the flip-flops configuring the scan chain to a plurality of groups.

FIG. 7 shows one example of the DFT information after grouping. As shown in FIG. 7, in the DFT information after grouping, the "Group" column serving as the grouping information is added to the DFT information. Such "Group" column is described in the form of (group ID number).(intra-group number), and indicates what order in the flip-flop group the flip-flop is present. For instance, the information "1.3" of the F/F No. 3 indicates the third flip-flop of the first flip-flop group.

(5) The scan chain is then divided into a plurality of flip-flop groups according to the DFT information after grouping obtained in step S4, and the LP test circuit is inserted into each flip-flop group (step S5). The logical network (i.e., final logical network) of the semiconductor integrated circuit inserted with the LP test circuit is thereby created. In other words, in step S5, the logical network is updated so as to insert the LP circuit to each flip-flop group.

Specifically, the LP test circuit is the continuous signal determination circuit 130, 230, . . . in the case of the embodiment shown in FIG. 1. In the case of the semiconductor integrated circuit that carries out clock gating in the normal operation, the multiplexers 141, 142, 241 and the clock gating circuits 151, 152, 251 are already arranged, and a signal line is merely re-connected for such circuits. In the case of the semiconductor integrated circuit that does not carry out clock gating in the normal operation, such circuits are also inserted as the LP test circuit by the process of the present step. The LP test circuit is a circuit that, when the same data ("0" or "1") is stored in all the flip-flops configuring the flip-flop group in a certain cycle, disables the clock signal (pulse) to the flip-flop other than the head flip-flop of the flip-flops configuring the flip-flop group in the next cycle.

The semiconductor integrated circuit inserted with the LP test circuit is designed through the procedures described above. The description made above is for a case where there is one scan chain, but if a plurality of scan chains are created by the process of step S1, the process of step S4 is executed for every scan chain. This process may be executed in parallel.

In the semiconductor integrated circuit designed with the method according to the present embodiment, the LP test circuit performs the most effective clock gating on the corresponding flip-flop group in the scan test. The power consumption of the semiconductor integrated circuit in the scan test is thereby reduced, and the IR drop can be alleviated.

In the above description of the method for designing the semiconductor integrated circuit, the scan chain for the scan test is the target of lower power consumption. A general shift register in the logical network for the normal operation may be the target of lower power consumption. The method for designing the semiconductor integrated circuit in this case will be described below.

First, the process of extracting a shift register from the logical network of the semiconductor integrated circuit is carried out, and the shift register information indicating the connection state of the flip-flop configuring the extracted shift register is created. Such shift register information corresponds to the DFT information described above.

The logical simulation of the logical network of the semiconductor integrated circuit is then carried out to acquire the data to be shifted on the extracted shift register. Similar to step S3 described above, such data is analyzed to acquire the maximum effective data continuing number n. The number of grouped elements is then calculated based on the maximum effective data continuing number. For instance, the number of grouped elements that realize the highest effective clock gating rate is calculated by substituting the maximum effective data continuing number n to equation (5).

The grouping information for dividing the flip-flops configuring the shift register into a plurality of groups is then added to the shift register information using the calculated number of grouped elements, thereby creating the shift register information after grouping. The shift register information after grouping corresponds to the DFT information after grouping.

Lastly, the shift register is divided into a plurality of flip-flop groups according to the shift register information after grouping, and the lower power consumption circuit is inserted into each flip-flop group to create the final logical network. In other words, the logical network is updated to insert the lower power consumption circuit to each flip-flop group.

Such lower power consumption circuit is similar to the LP circuit described above.

The number of grouped elements is not limited to m_best in the two methods for designing the semiconductor integrated circuit, and the DFT information after grouping (or shift register information after grouping) may be created using the value of greater than or equal to (m_best−1) and smaller than or equal to (m_best+3).

Furthermore, the DFT information after grouping (or shift register information after grouping) may be created using a plurality of number of grouped elements.

The LP test circuit or the lower power consumption circuit includes a circuit for taking the logical sum and/or logical product of the outputs of all the flip-flops configuring the flip-flop group.

If the majority of the data passing the shift register is "0" or "1" due to the specification of the LSI, the lower power consumption circuit to be inserted may simply take the logical product or the logical sum of the outputs of the flip-flops configuring the flip-flop group. Specifically, in the case of the embodiment shown in FIG. 1, the logical sum signal by the OR gates 134, 135, and 136 may be used as it is as the input signal to the multiplexer 141 if the majority of the data passing the shift register is "0", and the signal inverted from the logical product signal by the AND gates 131, 132 and 133 may be used as the input signal to the multiplexer 141 if the majority of the data passing the shift register is "1". The hardware amount of the lower power consumption circuit is thereby reduced to about half.

According to the designing method described above, the power consumption in the normal operation of the shift register in the logical circuit for normal operation (e.g., semiconductor integrated circuit 100 of FIG. 1) can be reduced. As a result, the IR drop can be suppressed in the normal operation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A method for designing a semiconductor integrated circuit comprising:

creating a logical network after DFT insertion and DFT information indicating a connection state of flip-flops configuring a scan chain by performing a design for testability of inserting a DFT circuit on a logical network of the semiconductor integrated circuit;

generating a test pattern using information related to the logical network after the DFT insertion and the DFT information;

acquiring a maximum effective data continuing number in which a product of a same data continuing number and number of occurrences of the same data continuing number becomes maximum by analyzing the test pattern;

calculating a number of grouped elements based on the maximum effective data continuing number;

creating DFT information after grouping by adding grouping information for dividing the flip-flops into a plurality of groups to the DFT information using the number of grouped elements; and dividing the scan chain into a plurality of flip-flop groups according to the DFT information after grouping, and updating the logical network so as to insert a lower power consumption test circuit to each flip-flop group, the lower power consumption test circuit being configured not to provide a clock signal to the flip-flop other than a head flip-flop of the flip-flops configuring the flip-flop group in the next cycle if same data is stored in all the flip-flops configuring the flip-flop group in a certain cycle.

2. The method for designing the semiconductor integrated circuit of claim 1, wherein a number in a range of m_best−1≤m≤m_best+3 with respect to an integer m_best given by equation (2) is used for the number of grouped elements, $$m\_best = Nearest\_int(\sqrt{n+1}) \quad (2)$$

where function Nearest_int is a function for returning a nearest integer from an argument, and n is the maximum effective data continuing number.

3. The method for designing the semiconductor integrated circuit of claim 1, wherein the lower power consumption test circuit includes a circuit configured to take a logical sum and/or logical product of outputs of all the flip-flops configuring the flip-flop group.

4. A method for designing a semiconductor integrated circuit comprising:

extracting a shift register from a logical network of a semiconductor integrate circuit, and creating shift register information indicating a connection state of flip-flops configuring the shift register;

acquiring data to be shifted on the shift register by carrying out a logical simulation of the logical network;

acquiring a maximum effective data continuing number in which a product of a same data continuing number and number of occurrences of the same data continuing number becomes maximum by analyzing the data;

calculating a number of grouped elements based on the maximum effective data continuing number;

creating shift register information after grouping by adding grouping information for dividing the flip-flops into a plurality of groups to the shift register information using the number of grouped elements; and dividing the shift register into a plurality of flip-flop groups according to the shift register information after grouping, and updating the logical network so as to insert a lower power consumption test circuit to each flip-flop group, the lower power consumption test circuit being configured not to provide a clock signal to the flip-flop other than a head flip-flop of the flip-flops configuring the flip-flop group in the next cycle if same data is stored in all the flip-flops configuring the flip-flop group in a certain cycle.

5. The method for designing the semiconductor integrated circuit of claim 4, wherein a number in a range of m_best−1≤m≤m_best+3 with respect to an integer m_best given by equation (3) is used for the number of grouped elements, $$m\_best = Nearest\_int(\sqrt{n+1}) \quad (3)$$

where function Nearest_int is a function for returning a nearest integer from an argument, and n is the maximum effective data continuing number.

6. The method for designing the semiconductor integrated circuit of claim 4, wherein the lower power consumption test circuit includes a circuit configured to take a logical sum and/or logical product of outputs of all the flip-flops configuring the flip-flop group.

* * * * *

UNITED STATES PATENT AND TRADEMARK OFFICE
CERTIFICATE OF CORRECTION

PATENT NO. : 9,075,946 B2  
APPLICATION NO. : 13/946929  
DATED : July 7, 2015  
INVENTOR(S) : Yasuyuki Nozuyama Page 1 of 1

It is certified that error appears in the above-identified patent and that said Letters Patent is hereby corrected as shown below:

Title Page, should read

(60) Division of Application No. 13/237,053, filed on Sep. 20, 2011.

In the Specification

In the Cross-Reference to the Related Application section:

Col. 1, line 13, please change "Sep. 20, 2010" to --Sep. 20, 2011--.

Signed and Sealed this
Fifteenth Day of December, 2015

Michelle K. Lee
*Director of the United States Patent and Trademark Office*